US012659081B2

(12) United States Patent
Dai et al.

(10) Patent No.: US 12,659,081 B2
(45) Date of Patent: Jun. 16, 2026

(54) METHOD FOR MANAGING DATA DROP RATE, CLIENT DEVICE, AND COMPUTER READABLE STORAGE MEDIUM

(71) Applicant: HTC Corporation, Taoyuan City (TW)

(72) Inventors: Chen-Si Dai, Taoyuan City (TW); Wei-Chih Kuo, Taoyuan City (TW); Chun-Hao Fan, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 22 days.

(21) Appl. No.: 18/599,159

(22) Filed: Mar. 7, 2024

(65) Prior Publication Data

US 2025/0080276 A1      Mar. 6, 2025

Related U.S. Application Data

(60) Provisional application No. 63/536,503, filed on Sep. 5, 2023.

(51) Int. Cl.
*H04L 1/08*          (2006.01)
*G06F 11/20*          (2006.01)

(52) U.S. Cl.
CPC ............ H04L 1/08 (2013.01); G06F 11/2002 (2013.01)

(58) Field of Classification Search
CPC ............................... H04L 1/08; G06F 11/2002
See application file for complete search history.

(56) References Cited

U.S. PATENT DOCUMENTS 8,693,334 B2 * 4/2014 Dattagupta .......... H04N 21/631
370/252

| | | | | |
|---|---|---|---|---|
| 11,729,074 B1 * | 8/2023 | Mishra | .................. | H04L 43/067 |
| | | | | 709/224 |
| 2003/0128741 A1 * | 7/2003 | Chun | ................... | H04B 1/7156 |
| | | | | 375/132 |
| 2004/0158794 A1 * | 8/2004 | Niesen | .................. | H04L 1/0057 |
| | | | | 714/758 |
| 2005/0216638 A1 * | 9/2005 | Smith | ................. | G06F 13/4265 |
| | | | | 710/305 |
| 2007/0127424 A1 | 6/2007 | Kwon et al. | | |
| 2009/0210765 A1 | 8/2009 | Henocq et al. | | |

(Continued)

FOREIGN PATENT DOCUMENTS

WO    WO-2017214556 A1 * 12/2017    ........... H04L 1/0009
WO    WO-2024118176 A1 *  6/2024    ............... H04L 1/08

OTHER PUBLICATIONS

"Office Action of Taiwan Counterpart Application", issued on Jun. 30, 2025, p. 1-p. 9.

*Primary Examiner* — Ashish Thomas
*Assistant Examiner* — Indranil Chowdhury
(74) *Attorney, Agent, or Firm* — JCIPRNET

(57)          ABSTRACT

The embodiments of the disclosure provide a method for managing data drop rate, a client device, and a computer readable storage medium. The method includes: determining, by the client device, a first data component corresponding to a t-th time point and a second data component, wherein the first data component belongs to a first data type, and the second data component belongs to the first data type or a second data type; sending, by the client device, a first data packet to a host at the t-th time point, wherein the first data packet comprises a first payload having a fixed size, and the first payload comprises the first data component and the second data component.

8 Claims, 3 Drawing Sheets

(56)                    References Cited

U.S. PATENT DOCUMENTS

| 2011/0211451 A1* | 9/2011 | Dattagupta | ...... H04N 21/64322 |
| | | | 370/235 |
| 2012/0054583 A1* | 3/2012 | Park | ...................... H04L 1/0083 |
| | | | 714/776 |
| 2012/0224691 A1* | 9/2012 | Purohit | ..................... H04L 1/04 |
| | | | 380/255 |
| 2013/0166981 A1* | 6/2013 | Lee | ..................... H04L 41/0668 |
| | | | 714/E11.131 |
| 2018/0278726 A1* | 9/2018 | Kyou | ...................... H04W 4/80 |
| 2021/0281486 A1* | 9/2021 | Singh Bawa | ....... H04L 41/0896 |
| 2021/0352164 A1* | 11/2021 | Pritchard | .............. H04L 47/245 |
| 2021/0377600 A1* | 12/2021 | Bastable | ........... H04N 21/2393 |
| 2021/0385169 A1* | 12/2021 | Urman | ...................... H04L 1/08 |
| 2022/0103353 A1* | 3/2022 | Hamila | ................... H04L 9/083 |
| 2025/0071613 A1* | 2/2025 | Ke | ........................ H04W 28/24 |
| 2025/0280311 A1* | 9/2025 | Negusse | .............. H04W 24/08 |
| 2026/0019475 A1* | 1/2026 | Alva | ....................... H04L 69/22 |

* cited by examiner client device determining a first data component corresponding to a
t-th time point and a second data component ~S210 sending a first data packet to a host at the t-th time point ~S220

METHOD FOR MANAGING DATA DROP RATE, CLIENT DEVICE, AND COMPUTER READABLE STORAGE MEDIUM

CROSS-REFERENCE TO RELATED APPLICATION

This application claims the priority benefit of U.S. provisional application Ser. No. 63/536,503, filed on Sep. 5, 2023. The entirety of the above-mentioned patent application is hereby incorporated by reference herein and made a part of this specification.

BACKGROUND

1. Field of the Invention

The present disclosure generally relates to a data transmission mechanism, in particular, to a method for managing data drop rate, a client device, and a computer readable storage medium.

2. Description of Related Art

Nowadays, using hosts such as a head-mounted display to experience reality services (e.g., virtual reality (VR) service, augmented reality (AR) service, etc.) has been a common activity.

When experiencing the reality services, the user may use some client devices (e.g., handheld controllers, wearable devices, or other peripheral devices) connected with the hosts to interact with the visual content (e.g., VR contents) of the reality services.

However, the data from the client devices to the hosts may be lost/dropped during transmission due to, for example, bad transmission channels, occlusion, or the like.

In this case, the quality of the user interacting with the visual content may be less satisfying. For example, if the pose data of the handheld controllers (which reflect the motion of the user's hands) are not properly/completely transmitted to the host, the motion of the user when interacting with the visual content may not be smooth.

For another example, if the control event data (e.g., some buttons have been pressed, battery status, connection reestablishment, etc.) of the handheld controllers are not properly/completely transmitted to the host, the user experience may be deteriorated since the operation intention of the user may not be correctly presented.

SUMMARY OF THE INVENTION

Accordingly, the disclosure is directed to a method for managing data drop rate, a client device, and a computer readable storage medium, which may be used to solve the above technical problems.

The embodiments of the disclosure provide a method for managing data drop rate, applied to a client device. The method includes: determining, by the client device, a first data component corresponding to a t-th time point and a second data component, wherein the first data component belongs to a first data type, and the second data component belongs to the first data type or a second data type; sending, by the client device, a first data packet to a host at the t-th time point, wherein the first data packet comprises a first payload having a fixed size, and the first payload comprises the first data component and the second data component.

The embodiments of the disclosure provide a client device including a non-transitory storage circuit and a processor. The storage circuit stores a program code. The processor is coupled to the non-transitory storage circuit and accesses the program code to perform: determining a first data component corresponding to a t-th time point and a second data component, wherein the first data component belongs to a first data type, and the second data component belongs to the first data type or a second data type; sending a first data packet to a host at the t-th time point, wherein the first data packet comprises a first payload having a fixed size, and the first payload comprises the first data component and the second data component.

The embodiments of the disclosure provide a non-transitory computer readable storage medium, the computer readable storage medium recording an executable computer program, the executable computer program being loaded by a client device to perform steps of: determining a first data component corresponding to a t-th time point and a second data component, wherein the first data component belongs to a first data type, and the second data component belongs to a first data type or a second data type; and sending a first data packet to a host at the t-th time point, wherein the first data packet comprises a first payload having a fixed size, and the first payload comprises the first data component and the second data component.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
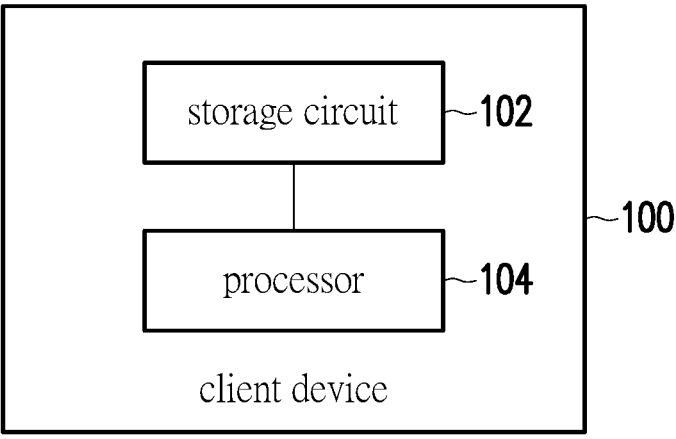
FIG. 1 shows a schematic diagram of a client device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a client device according to an embodiment of the disclosure. In various embodiments, the client device 100 can be a handheld controller, a wearable device, or any other peripheral device that can be connected to a host (e.g., an HMD). In some embodiments, the client device 100 can detect/generate data components belonging to various data types, and the data components can be provided to the host for further applications. For example, the host may be a particular electronic device (e.g., the HMD) providing reality services (e.g., VR/AR services), and the host may use the data components from the client device 100 to, for example, adjust the associated visual contents, but the disclosure is not limited thereto.

In some embodiments, the data types may include a pose data type and a control event type.

For example, in the embodiment where the client device 100 is a handheld controller connected to the HMD, the client device 100 can detect the pose thereof by using motion detection circuits (e.g., an inertial measurement unit (IMU)), generate the associated data component belonging to the pose data type, and provide the data component belonging to the pose data type to the HMD.

In some embodiments, the client device 100 can be disposed with physical buttons, and the client device can generate the associated data components belonging to the control event type in response to determining that one or more of the physical buttons has been pressed (which can be understood as a button event).

For example, if the pressed button(s) corresponds to a connection reestablishment event, the client device 100 may generate the associated data component and provide the data component to the HMD for controlling the HMD to reestablish the connection with the client device 100.

In another embodiment, the client device 100 may generate the data components belonging to the control event type based on the device status of the client device 100. For example, when the client device 100 determines that the client device 100 is experiencing a low battery event, the client device 100 may provide battery status to the HMD as the data components belonging to the control event type.

In some embodiments, the client device 100 can provide the above data components to the host by using some existing communication protocols, such as Bluetooth low energy (BLE), Wifi, or the like.

In one embodiment, the client device 100 can send data packets to the host, wherein each data packet can include, for example, a header and a payload, wherein the header may include information such as source, destination, timestamp, index, etc., and the payload may be used to carry the data components belonging to the data types (e.g., the pose data type and/or the control event type), but the disclosure is not limited thereto.

In the embodiments of the disclosure, the payload in each data packet can have a fixed size. That is, the size of the payload in each data packet is the same. For example, the size of the payload in each data packet may be 64 bytes, but the disclosure is not limited thereto.

In the embodiments of the disclosure, the sizes of the data components belonging to the pose data type can be the same. On the other hand, the sizes of the data components belonging to the control event type may be various depending on the corresponding events. For example, the data components corresponding to a button event and the low battery event can be different, but the disclosure is not limited thereto.

In FIG. 1, the client device 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or a program code that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules and/or the program code stored in the storage circuit 102 to implement the method for managing data drop rate provided in the disclosure, which would be further discussed in the following.

Figure 2:
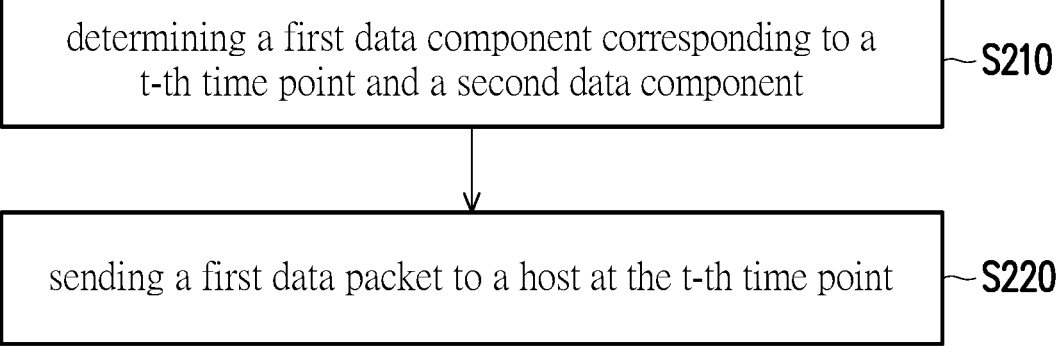
FIG. 2 shows a flow chart of the method for managing data drop rate according to an embodiment of the disclosure.

See FIG. 2, which shows a flow chart of the method for managing data drop rate according to an embodiment of the disclosure. The method of this embodiment may be executed by the client device 100 in FIG. 1, and the details of each step in FIG. 2 will be described below with the components shown in FIG. 1.

In step S210, the processor 104 determining a first data component corresponding to a t-th time point and a second data component, wherein the first data component belongs to a first data type, and the second data component belongs to the first data type or a second data type, and t is an index.

In the embodiments of the disclosure, the first data type may be the pose data type, and the second data type may be the control event type, but the disclosure is not limited thereto.

In step S220, the processor 104 sends a first data packet to a host at the t-th time point, wherein the first data packet includes a first payload having a fixed size, and the first payload includes the first data component and the second data component.

In different embodiments, the second data component in the first data packet may correspond to the t-th time point or a historical time point before the t-th time point.

In a first embodiment, in response to determining that the host fails to receive a historical data component corresponding to the historical time point from the client device 100, the processor 104 determines the historical data component as the second data component.

In one embodiment, the processor 104 may determine whether the client device 100 receives an acknowledgement associated with a historical data component packet, wherein the historical data component packet may carry the historical data component and be sent at a historical time point before the t-th time point.

In one embodiment, in response to determining that the client device 100 fails to receive the acknowledgement associated with the historical data component packet, the processor 104 may determine that the host fails to receive the historical data component, but the disclosure is not limited thereto.

In a second embodiment, in response to determining that a new data component belonging to the second data type is generated at the t-th time point, the processor 104 may determine the new data component as the second data component.

In a third embodiment, in response to determining that the host fails to receive a historical data component corresponding to the historical time point from the client device 100 and a new data component belonging to the second data type is generated at the t-th time point, the processor 104 may determine the new data component as the second data component.

In a fourth embodiment, in response to determining that the host fails to receive a historical data component corresponding to the historical time point from the client device 100 and a new data component belonging to the second data type is generated at the t-th time point, the processor 104 may determine which of the historical data component and the new data component is more suitable to be determined as the second data component.

In the fourth embodiment, the processor 104 may determine a remaining size in the first payload after including the first data component into the first payload. In response to determining that a size of only one of the historical data component and the new data component is smaller than the remaining size, the processor 104 may determine the one of the historical data component and the new data component is more suitable to be determined as the second data component. On the other hand, in response to determining that both of the historical data component and the new data component is smaller than the remaining size, the processor 104 may determine the new data component is more suitable to be determined as the second data component.

In the fourth embodiment, in response to determining that the new data component is more suitable to be determined as the second data component, the processor 104 may determine the new data component as the second data component. On the other hand, in response to determining that the historical data component is more suitable to be determined as the second data component, the processor 104 may determine the historical data component as the second data component.

For better understanding the concept of the disclosure, FIG. 3 to FIG. 6 would be used as examples, wherein FIG. 3 to FIG. 6 show application scenarios according to embodiments of the disclosure. In FIG. 3 to FIG. 6, each data packet is shown as the corresponding payload for brevity, but the disclosure is not limited thereto. In addition, the data component belonging to the pose data type would be referred to as a pose data component, and the data component belonging to the control event type would be referred to as a control data component, but the disclosure is not limited thereto.

Figures 3, 4:
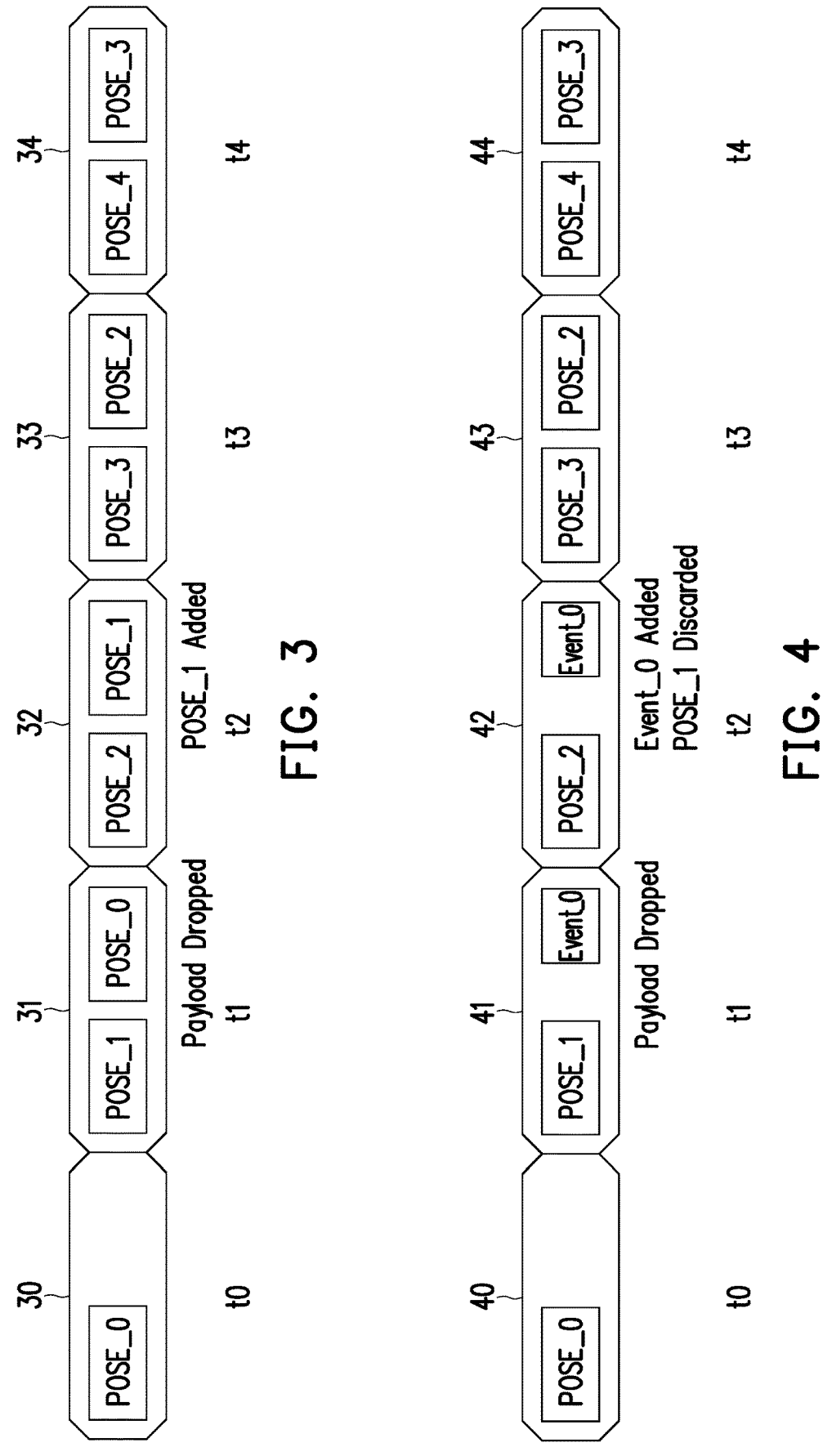
FIG. 3 to FIG. 6 show application scenarios according to embodiments of the disclosure.

In FIG. 3, the processor 104 may use the payload 30 to transmit the pose data component POSE_0 to the host at the time point t0, wherein the pose data component POSE_0 may be the pose data of the client device 100 at the time point to.

In the embodiment, assuming that the processor 104 determines that the host has received the data packet corresponding to the payload 30 at the time point t1, the processor 104 may determine that the host has received the pose data component POSE_0. In this case, the processor 104 may regard the pose data component POSE_0 as a historical data component corresponding to the historical time point t0.

In one embodiment, the processor 104 may use the payload 31 to transmit the pose data components POSE_0 and POSE_1 to the host at the time point t1, wherein the pose data component POSE_1 may be the pose data of the client device 100 at the time point t1. In this case, the pose data components POSE_1 and POSE_0 can be respectively understood as the first data component and the second data component carried in the payload 31.

That is, even if the processor 104 determines, at the time point t1, that the pose data component POSE_0 was successfully transmitted to the host at the time point to, the processor 104 may still add the pose data component POSE_0 into the payload 31 as the second data component, but the disclosure is not limited thereto.

For the time point t2 in FIG. 3, assuming that the processor 104 determines that the host fails to receive the data packet corresponding to the payload 31 at the time point t2, the processor 104 may determine that the host fails to receive the pose data component POSE_1 (and POSE_0) carried in the payload 31. In this case, the processor 104 may regard the pose data component POSE_1 as a historical data component corresponding to the historical time point t1.

Therefore, the processor 104 may use the payload 32 to transmit the pose data components POSE_2 and POSE_1 to the host at the time point t2, wherein the pose data component POSE_2 may be the pose data of the client device 100 at the time point t2. In this case, the pose data components POSE_2 and POSE_1 can be respectively understood as the first data component and the second data component carried in the payload 32.

That is, when the processor 104 determines, at the time point t2, that the pose data component POSE_1 was not successfully transmitted to the host at the time point t1, the processor 104 may add the pose data component POSE_1 into the payload 32 as the second data component, but the disclosure is not limited thereto.

From another perspective, the pose data component POSE_1 would be transmitted again, which reduces the possibility of the pose data component POSE_1 being lost/dropped.

For the time point t3 in FIG. 3, assuming that the processor 104 determines that the host has received the data packet corresponding to the payload 32 at the time point t3, the processor 104 may determine that the host has received the pose data component POSE_2 (and POSE_1) carried in the payload 32. In this case, the processor 104 may regard the pose data component POSE_2 as a historical data component corresponding to the historical time point t2.

In the embodiment, even the pose data component POSE_2 has been received by the host, the processor 104 may still use the payload 33 to transmit the pose data components POSE_3 and POSE_2 to the host at the time point t3, wherein the pose data component POSE_3 may be the pose data of the client device 100 at the time point t3. In this case, the pose data components POSE_3 and POSE_2 can be respectively understood as the first data component and the second data component carried in the payload 33.

That is, when the processor 104 determines, at the time point t3, that the pose data component POSE_2 was successfully transmitted to the host at the time point t2, the processor 104 may still add the pose data component POSE_2 into the payload 33 as the second data component, but the disclosure is not limited thereto.

From another perspective, the pose data component POSE_2 would be transmitted again, which reduces the possibility of the pose data component POSE_2 being lost/dropped.

For the time point t4 in FIG. 3, assuming that the processor 104 determines that the host has received the data packet corresponding to the payload 33 at the time point t4, the processor 104 may determine that the host has received the pose data component POSE_3 (and POSE_2) carried in the payload 33. In this case, the processor 104 may regard the pose data component POSE_3 as a historical data component corresponding to the historical time point t3.

In the embodiment, even the pose data component POSE_3 has been received by the host, the processor 104 may still use the payload 34 to transmit the pose data components POSE_4 and POSE_3 to the host at the time point t4, wherein the pose data component POSE_4 may be the pose data of the client device 100 at the time point t4. In this case, the pose data components POSE_4 and POSE_3 can be respectively understood as the first data component and the second data component carried in the payload 34.

That is, when the processor 104 determines, at the time point t4, that the pose data component POSE_3 was successfully transmitted to the host at the time point t3, the processor 104 may still add the pose data component POSE_3 into the payload 34 as the second data component, but the disclosure is not limited thereto.

In FIG. 4, the processor 104 may use the payload 40 to transmit the pose data component POSE_0 to the host at the time point to.

In the embodiment, the processor 104, at the time point t1, may regard the pose data component POSE_0 as a historical data component corresponding to the historical time point t0.

At the time point t1, it is assumed that a control data component Event_0 is newly generated. In this case, the processor 104 may use the payload 41 to transmit the pose data component POSE_1 and the control data component Event_0 to the host at the time point t1. In this case, the pose data component POSE_1 and the control data component Event_0 can be respectively understood as the first data component and the second data component carried in the payload 41.

That is, the processor 104 may add the control data component Event_0 into the payload 41 as the second data component, but the disclosure is not limited thereto.

For the time point t2 in FIG. 4, assuming that the processor 104 determines that the host fails to receive the data packet corresponding to the payload 41 at the time point t2, the processor 104 may determine that the host fails to receive the pose data component POSE_1 and the control data component Event_0 carried in the payload 41. In this case, the processor 104 may regard the pose data component POSE_1 as a historical data component corresponding to the historical time point t1.

In the embodiment, assuming that the importance of a control data component is higher than a pose data component, the control data component Event_0 may be retransmitted with a priority higher than the pose data component POSE_1.

Therefore, in the case where the payload 42 has limited size, the processor 104 may use the payload 42 to transmit the pose data component POSE_2 and the control data component Event_0 to the host at the time point t2. In this case, the pose data component POSE_2 and the control data component Event_0 can be respectively understood as the first data component and the second data component carried in the payload 42.

That is, when the processor 104 determines, at the time point t2, that both of the pose data component POSE_1 and the control data component Event_0 were not successfully transmitted to the host at the time point t1, the processor 104 may add the control data component Event_0 with the higher priority into the payload 42 as the second data component and discard the pose data component POSE_1, but the disclosure is not limited thereto.

From another perspective, the control data component Event_0 would be transmitted again, which reduces the possibility of the control data component Event_0 being lost/dropped.

For the time point t3 in FIG. 4, assuming that the processor 104 determines that the host has received the data packet corresponding to the payload 42 at the time point t3, the processor 104 may determine that the host has received the pose data component POSE_2 and the control data component Event_0 carried in the payload 42. In this case, the processor 104 may regard the pose data component POSE_2 as a historical data component corresponding to the historical time point t2.

In the embodiment, even the pose data component POSE_2 has been received by the host, the processor 104 may still use the payload 43 to transmit the pose data components POSE_3 and POSE_2 to the host at the time point t3 in a case no new control data component is generated at the time point t3. In this case, the pose data components POSE_3 and POSE_2 can be respectively understood as the first data component and the second data component carried in the payload 43.

That is, when the processor 104 determines, at the time point t3, that the pose data component POSE_2 was successfully transmitted to the host at the time point t2, the processor 104 may still add the pose data component POSE_2 into the payload 43 as the second data component, but the disclosure is not limited thereto.

From another perspective, the pose data component POSE_2 would be transmitted again, which reduces the possibility of the pose data component POSE_2 being lost/dropped.

For the time point t4 in FIG. 4, assuming that the processor 104 determines that the host has received the data packet corresponding to the payload 43 at the time point t4, the processor 104 may determine that the host has received the pose data component POSE_3 (and POSE_2 carried in the payload 43. In this case, the processor 104 may regard the pose data component POSE_3 as a historical data component corresponding to the historical time point t3.

In the embodiment, even the pose data component POSE_3 has been received by the host, the processor 104 may still use the payload 44 to transmit the pose data components POSE_4 and POSE_3 to the host at the time point t4 in a case no new control data component is generated at the time point t4. In this case, the pose data components POSE_4 and POSE_3 can be respectively understood as the first data component and the second data component carried in the payload 44.

That is, when the processor 104 determines, at the time point t4, that the pose data component POSE_3 was successfully transmitted to the host at the time point t3, the processor 104 may still add the pose data component POSE_3 into the payload 44 as the second data component, but the disclosure is not limited thereto.

From another perspective, the pose data component POSE_3 would be transmitted again, which reduces the possibility of the pose data component POSE_3 being lost/dropped.

Figures 5, 6:
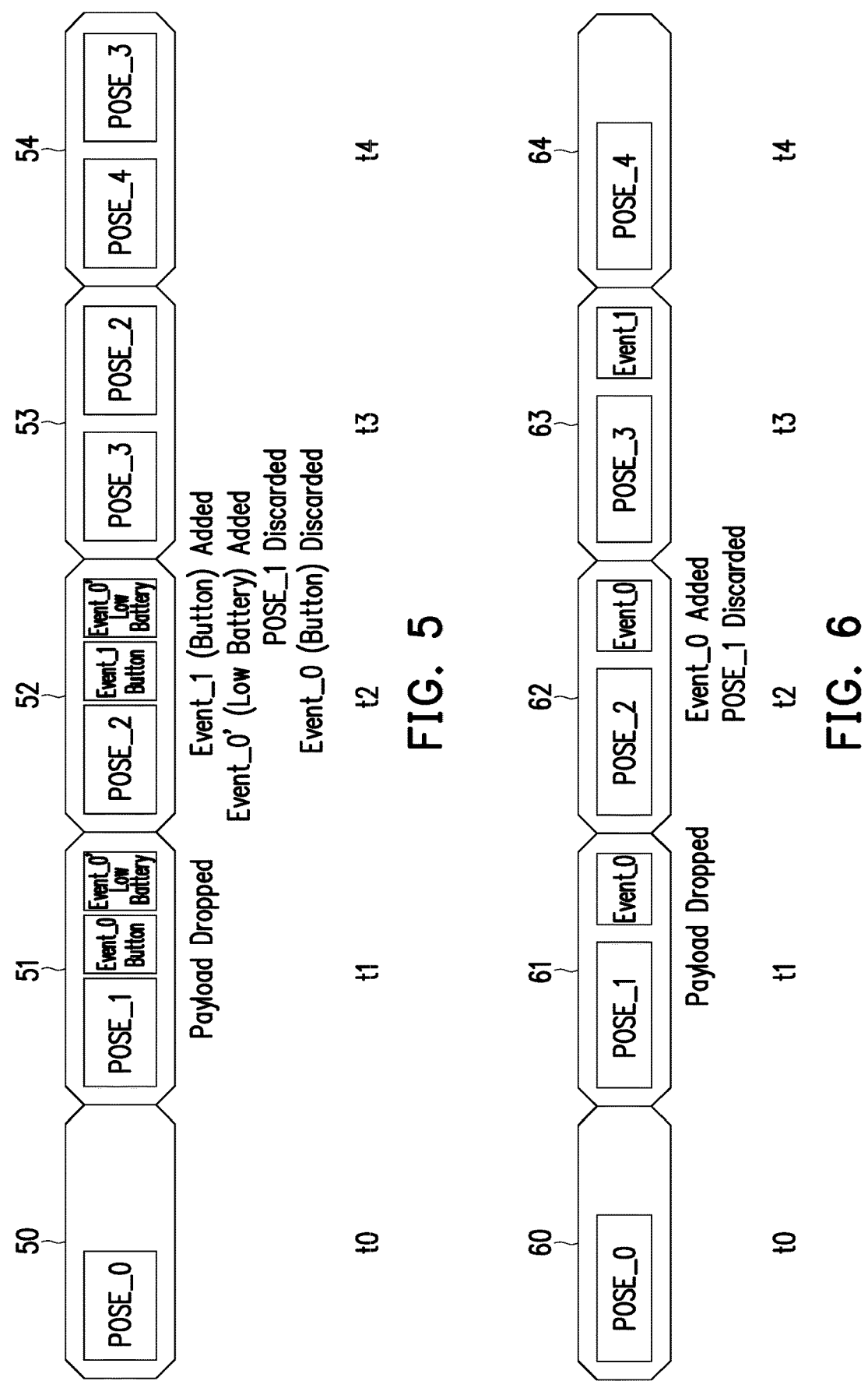

In FIG. 5, the processor 104 may use the payload 50 to transmit the pose data component POSE_0 to the host at the time point t0.

In the embodiment, the processor 104, at the time point t1, may regard the pose data component POSE_0 as a historical data component corresponding to the historical time point t0.

At the time point t1, it is assumed that control data components Event_0 and Event_0' are newly generated, wherein the control data components Event_0 and Event_0' may be respectively associated with a button event and a low battery event. In this case, the processor 104 may use the payload 51 to transmit the pose data component POSE_1 and the control data components Event_0 and Event_0' to the host at the time point t1. In this case, the pose data component POSE_1, the control data components Event_0' and Event_0 can be respectively understood as the first data component, the second data component, and a third data component carried in the payload 51.

That is, the processor 104 may include the control data components Event_0' and Event_0 into the payload 51 respectively as the second data component and the third data component if the size of the payload 51 is enough, but the disclosure is not limited thereto.

For the time point t2 in FIG. 5, assuming that the processor 104 determines that the host fails to receive the data packet corresponding to the payload 51 at the time point t2, the processor 104 may determine that the host fails to receive the pose data component POSE_1 and the control data components Event_0' and Event_0 carried in the payload 51. In this case, the processor 104 may regard the pose data component POSE_1 as a historical data component corresponding to the historical time point t1.

In the embodiment, assuming that the importance of a control data component is higher than a pose data component, and the importance of the low battery event is higher than a button event, the control data component Event_0' should be retransmitted with a priority higher than the pose data component POSE_1 and the data component Event_0.

Therefore, in the case where the payload 52 has limited size and a control data component Event_1 (which may correspond to another button event) is newly generated at the time point t2, the processor 104 may use the payload 52 to transmit the pose data component POSE_2 and the control data components Event_0' and Event_1 to the host at the time point t2. In this case, the pose data component POSE_2 and the control data components Event_0' and Event_1 can be respectively understood as the first data component, the second data component, and the third data component carried in the payload 52.

That is, when the processor 104 determines, at the time point t2, that all of the pose data component POSE_1 and the control data components Event_0' and Event_0 were not successfully transmitted to the host at the time point t1, the processor 104 may add the control data component Event_0' with the higher priority into the payload 52 as the second data component and discard the pose data component POSE_1 and the control data component Event_0, but the disclosure is not limited thereto.

From another perspective, the control data component Event_0' would be transmitted again, which reduces the possibility of the control data component Event_0' being lost/dropped.

For the time point t3 in FIG. 5, assuming that the processor 104 determines that the host has received the data packet corresponding to the payload 52 at the time point t3, the processor 104 may determine that the host has received the pose data component POSE_2 and the control data component Event_0' and Event_1 carried in the payload 52. In this case, the processor 104 may regard the pose data component POSE_2 as a historical data component corresponding to the historical time point t2.

In the embodiment, even the pose data component POSE_2 has been received by the host, the processor 104 may still use the payload 53 to transmit the pose data components POSE_3 and POSE_2 to the host at the time point t3 in a case no new control data component is generated at the time point t3. In this case, the pose data components POSE_3 and POSE_2 can be respectively understood as the first data component and the second data component carried in the payload 53.

That is, when the processor 104 determines, at the time point t3, that the pose data component POSE_2 was successfully transmitted to the host at the time point t2, the processor 104 may still add the pose data component POSE_2 into the payload 53 as the second data component, but the disclosure is not limited thereto.

For the time point t4 in FIG. 5, assuming that the processor 104 determines that the host has received the data packet corresponding to the payload 53 at the time point t4, the processor 104 may determine that the host has received the pose data component POSE_3 and POSE_2 carried in the payload 53. In this case, the processor 104 may regard the pose data component POSE_3 as a historical data component corresponding to the historical time point t3.

In the embodiment, even the pose data component POSE_3 has been received by the host, the processor 104 may still use the payload 54 to transmit the pose data components POSE_4 and POSE_3 to the host at the time point t4 in a case no new control data component is generated at the time point t4. In this case, the pose data components POSE_4 and POSE_3 can be respectively understood as the first data component and the second data component carried in the payload 54.

That is, when the processor 104 determines, at the time point t4, that the pose data component POSE_3 was successfully transmitted to the host at the time point t3, the processor 104 may still add the pose data component POSE_3 into the payload 54 as the second data component, but the disclosure is not limited thereto.

From another perspective, the pose data component POSE_3 would be transmitted again, which reduces the possibility of the pose data component POSE_3 being lost/dropped.

In FIG. 6, the processor 104 may use the payload 60 to transmit the pose data component POSE_0 to the host at the time point t0.

In the embodiment, the processor 104, at the time point t1, may regard the pose data component POSE_0 as a historical data component corresponding to the historical time point t0.

At the time point t1, it is assumed that a control data component Event_0 is newly generated. In this case, the processor 104 may use the payload 61 to transmit the pose data component POSE_1 and the control data component Event_0 to the host at the time point t1. In this case, the pose data component POSE_1 and the control data component Event_0 can be respectively understood as the first data component and the second data component carried in the payload 61.

That is, the processor 104 may add the control data component Event_0 into the payload 61 as the second data component, but the disclosure is not limited thereto.

For the time point t2 in FIG. 6, assuming that the processor 104 determines that the host fails to receive the data packet corresponding to the payload 61 at the time point t2, the processor 104 may determine that the host fails to receive the pose data component POSE_1 and the control data component Event_0 carried in the payload 61. In this case, the processor 104 may regard the pose data component POSE_1 as a historical data component corresponding to the historical time point t1.

In the embodiment, it is assumed that the remaining size in the payload 62 is not enough for another pose data component after carrying the pose data component POSE_2 but enough for another control data component. That is, only the size of the control data component Event_0 is smaller than the remaining size in the payload 62, which means that the control data component Event_0 is more suitable to be determined as the second data component of the payload 62. Therefore, in the case where the payload 62 has limited size, the processor 104 may use the payload 62 to transmit the pose data component POSE_2 and the control data component Event_0 to the host at the time point t2. In this case, the pose data component POSE_2 and the control data component Event_0 can be respectively understood as the first data component and the second data component carried in the payload 62.

That is, when the processor 104 determines, at the time point t2, that both of the pose data component POSE_1 and the control data component Event_0 were not successfully transmitted to the host at the time point t1, the processor 104 may add the control data component Event_0 into the payload 62 as the second data component and discard the pose data component POSE_1, but the disclosure is not limited thereto.

From another perspective, the control data component Event_0 would be transmitted again at the time point t2, which reduces the possibility of the control data component Event_0 being lost/dropped.

In another embodiment, if the remaining size in the payload 62 is enough for another pose data component and another control data component after carrying the pose data component POSE_2, the processor 104 may also carry the pose data component POSE_1 as a third data component in the payload 62, but the disclosure is not limited thereto.

For the time point t3 in FIG. 6, it is assumed that the processor 104 determines that the host has received the data packet corresponding to the payload 62 and a control data component Event_1 is newly generated at the time point t3. In this case, the processor 104 may determine that the host has received the pose data component POSE_2 and the control data component Event_0 carried in the payload 62. In this case, the processor 104 may regard the pose data component POSE_2 as a historical data component corresponding to the historical time point t2.

In the embodiment, the processor 104 may use the payload 63 to transmit the pose data component POSE_3 and the control data component Event_1 to the host at the time point t3. In this case, the pose data component POSE_3 and the control data component Event_1 can be respectively understood as the first data component and the second data component carried in the payload 63.

That is, the processor 104 may add the control data component Event_1 into the payload 63 as the second data component, but the disclosure is not limited thereto.

For the time point t4 in FIG. 6, assuming that the processor 104 determines that the host has received the data packet corresponding to the payload 63 at the time point t4, the processor 104 may determine that the host has received the pose data component POSE_3 and the control data component Event_1 carried in the payload 63. In this case, the processor 104 may regard the pose data component POSE_3 as a historical data component corresponding to the historical time point t3.

In the embodiment, it is assumed that no new control data component is generated at the time point t4. In this case, the processor 104 may use the payload 64 to transmit the pose data component POSE_4 to the host at the time point t4, but the disclosure is not limited thereto.

The disclosure further provides a computer readable storage medium for executing the method for managing data drop rate. The computer readable storage medium is composed of a plurality of program instructions (for example, a setting program instruction and a deployment program instruction) embodied therein. These program instructions can be loaded into the client device 100 and executed by the same to execute the method for managing data drop rate and the functions of the client device 100 described above.

In summary, the embodiments of the disclosure provide a solution to use the payload of the data packet corresponding to the t-th time point to carry the first data component belonging to the first data type and the second data component belonging to the first or second data type. In some embodiments, the second data component belonging to the second data type may correspond to a historical time point, which improves the transmission robustness, flexibility, and reduces the data drop rate.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for managing data drop rate, applied to a client device, comprising:

determining, by the client device, a first data component corresponding to a t-th time point and a second data component, wherein the first data component belongs to a first data type, and the second data component belongs to the first data type or a second data type, and t is an index, wherein the first data component corresponding to the t-th time point and other first data components respectively belonging to the first data type and corresponding to other time points have a same size, wherein the second data component in the first data packet corresponds to the t-th time point or a historical time point before the t-th time point;

in response to determining that a host fails to receive a historical data component corresponding to the historical time point from the client device and a new data component belonging to the second data type is generated at the t-th time point, determining which of the historical data component and the new data component is more suitable to be determined as the second data component;

in response to determining that the new data component is more suitable to be determined as the second data component, determining the new data component as the second data component;

in response to determining that the historical data component is more suitable to be determined as the second data component, determining the historical data component as the second data component; and sending, by the client device, a first data packet to the host at the t-th time point, wherein the first data packet comprises a first payload, and the first payload comprises the first data component and the second data component, wherein the first payload of the first data packet at the t-th time point and other first payloads respectively corresponding to other time points have the same size.

2. The method according to claim 1, wherein the first data type comprises a pose data type, and the second data type comprises a control event type.

3. The method according to claim 1, wherein determining which of the historical data component and the new data component is more suitable to be determined as the second data component comprises:

determining a remaining size in the first payload after including the first data component into the first payload;

in response to determining that a size of only one of the historical data component and the new data component is smaller than the remaining size, determining the one of the historical data component and the new data component is more suitable to be determined as the second data component;

in response to determining that both of the historical data component and the new data component is smaller than the remaining size, determining the new data component is more suitable to be determined as the second data component.

4. The method according to claim 1, wherein the client device is a handheld controller for a reality service.

5. A client device, comprising:

a non-transitory storage circuit, storing a program code; and a processor, coupled to the non-transitory storage circuit and accessing the program code to perform:

determining a first data component corresponding to a t-th time point and a second data component, wherein the first data component belongs to a first data type, and the second data component belongs to the first data type or a second data type, and t is an index, wherein the first data component corresponding to the t-th time point and other first data components respectively belonging to the first data type and corresponding to other time points have a same size, wherein the second data component in the first data packet corresponds to the t-th time point or a historical time point before the t-th time point;

in response to determining that a host fails to receive a historical data component corresponding to the historical time point from the client device and a new data component belonging to the second data type is generated at the t-th time point, determining which of the historical data component and the new data component is more suitable to be determined as the second data component;

in response to determining that the new data component is more suitable to be determined as the second data component, determining the new data component as the second data component;

in response to determining that the historical data component is more suitable to be determined as the second data component, determining the historical data component as the second data component; and sending a first data packet to the host at the t-th time point, wherein the first data packet comprises a first payload, and the first payload comprises the first data component and the second data component, wherein the first payload of the first data packet at the t-th time point and other first payloads respectively corresponding to other first data packets at the other time points have the same size.

6. The client device according to claim 5, wherein the first data type comprises a pose data type, and the second data type comprises a control event type.

7. The client device according to claim 5, wherein the processor performs:

determining a remaining size in the first payload after including the first data component into the first payload;

in response to determining that a size of only one of the historical data component and the new data component is smaller than the remaining size, determining the one of the historical data component and the new data component is more suitable to be determined as the second data component;

in response to determining that both of the historical data component and the new data component is smaller than the remaining size, determining the new data component is more suitable to be determined as the second data component.

8. A non-transitory computer readable storage medium, the computer readable storage medium recording an executable computer program, the executable computer program being loaded by a client device to perform steps of:

determining a first data component corresponding to a t-th time point and a second data component, wherein the first data component belongs to a first data type, and the second data component belongs to the first data type or a second data type, and t is an index, wherein the first data component corresponding to the t-th time point and other first data components respectively belonging to the first data type and corresponding to other time points have a same size, wherein the second data component in the first data packet corresponds to the t-th time point or a historical time point before the t-th time point;

in response to determining that a host fails to receive a historical data component corresponding to the historical time point from the client device and a new data component belonging to the second data type is generated at the t-th time point, determining which of the historical data component and the new data component is more suitable to be determined as the second data component;

in response to determining that the new data component is more suitable to be determined as the second data component, determining the new data component as the second data component;

in response to determining that the historical data component is more suitable to be determined as the second data component, determining the historical data component as the second data component; and sending a first data packet to the host at the t-th time point, wherein the first data packet comprises a first payload, and the first payload comprises the first data component and the second data component, wherein the first payload of the first data packet at the t-th time point and other first payloads respectively corresponding to other first data packets at the other time points have the same size.

* * * * *